(No Model.)

F. F. DUMKE.
PEN AND PENCIL RACK.

No. 271,817. Patented Feb. 6, 1883.

WITNESSES
F. L. Ourand
C. J. Williamson.

INVENTOR
Frank F. Dumke
By Stout & Underwood
Attorneys.

UNITED STATES PATENT OFFICE.

FRANK F. DUMKE, OF MILWAUKEE, WIS., ASSIGNOR TO CHARLES BORCHERT, WILLIAM P. VOLLERT, AND HENRY BOLLOW, OF SAME PLACE.

PEN AND PENCIL RACK.

SPECIFICATION forming part of Letters Patent No. 271,817, dated February 6, 1883.

Application filed July 17, 1882. (No model.)

*To all whom it may concern:*

Be it known that I, FRANK F. DUMKE, of Milwaukee, in the county of Milwaukee, and in the State of Wisconsin, have invented certain new and useful Improvements in Racks or Holders for Pencils, Pens, &c.; and I do hereby declare that the following is a full, clear, and exact description thereof.

My invention relates to devices for holding lead and slate pencils, pen-holders, and similar articles in place, and is particularly adapted for use in schools and draftsmen's or architect's offices; and it consists in certain peculiarities of construction, all as will be more particularly set forth hereinafter.

Figure 1:
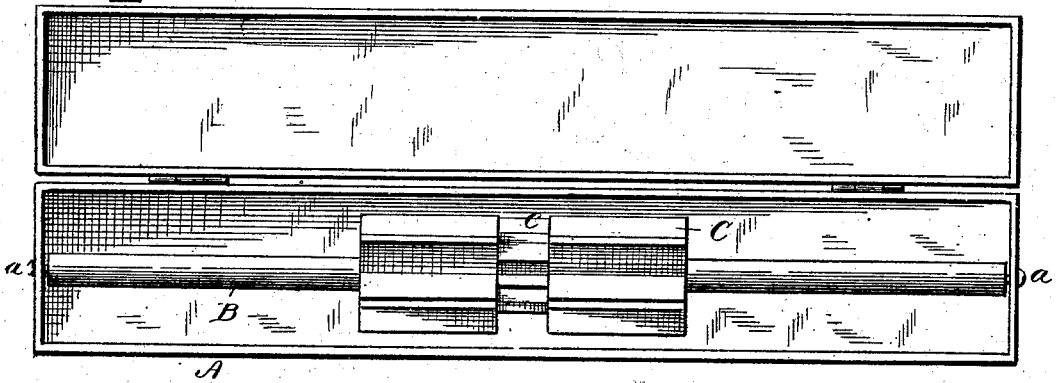
Figure 2:
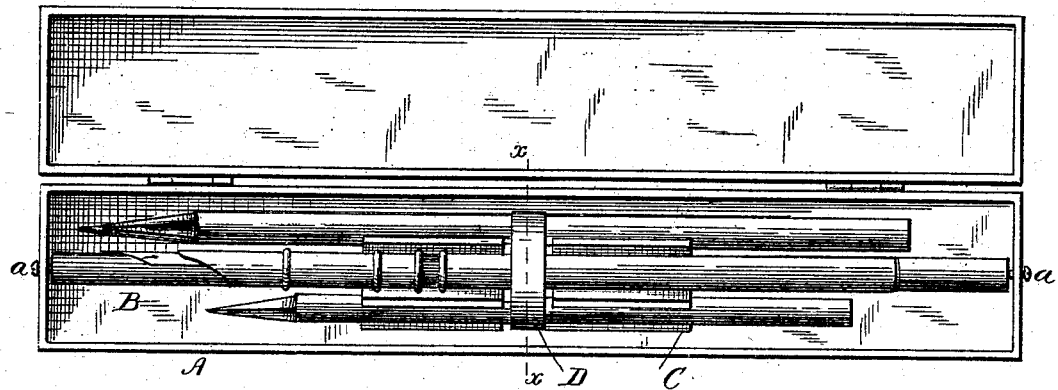
Figure 3:
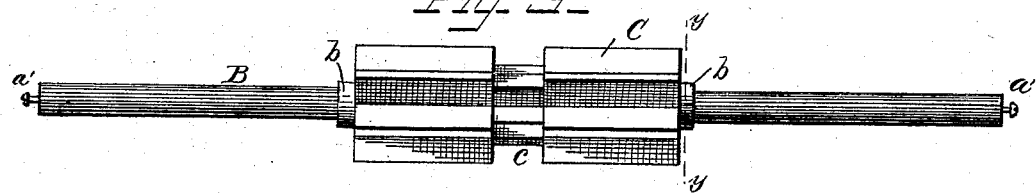
Figure 4:
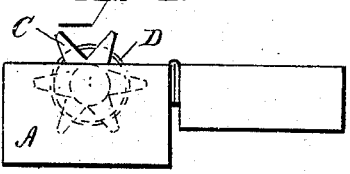
Figure 5:
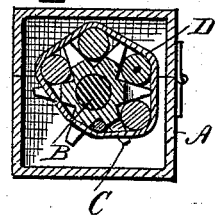
Figure 6:
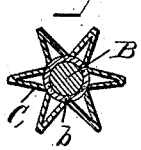

In the drawings, Figure 1 is a plan view of one form of my device mounted in a box or case with the cover open, and with the pens, pencils, &c., and the securing device removed. Fig. 2 is a like view, but showing the device in use, with the pencils, &c., held in place by a securing device. Fig. 3 is a modification of the device shown in Fig. 1. Fig. 4 is an end view of the device shown in Fig. 1, but with the securing device in place. Fig. 5 is a cross-section on the line $x\ x$ of Fig. 2, but showing the cover closed; and Fig. 6 is a view on the line $y\ y$ of Fig. 3.

A represents a case or box, which may be of any preferred or suitable shape and material, so long as it is rigid and non-flexible. It may be of pasteboard, wood, metal, &c., and painted, japanned, or covered with cloth or paper, or not, as preferred, and it may have rounded or beveled corners, or the whole box may be round or oblong in cross-section; but I find the shape shown in the drawings as convenient as any.

B represents the shaft, which may be either capable of revolution, as in Figs. 1 and 2, or stationary, as in Fig. 3.

C is the holder proper, made of any desired material—such as pasteboard—and preferably of the shape of a star in cross-section, as shown, and which may be made with any desired number of sections or compartments. In Figs. 1 and 2 this holder is represented as rigidly secured to the shaft B and adapted to revolve with it, the screws or pins $a\ a$ being, in fact, trunnions, while in Fig. 3 the shaft B is shown adapted to be held rigidly to the box or case by the screws or pins $a'\ a'$, and the holder C then revolves upon the shaft, instead of with it, being secured against lateral movement by the rings or collars $b\ b$, which are rigidly secured to the shaft B; but in either case the holder C revolves, and hence it is immaterial whether the shaft B is movable or stationary.

D represents the simplest form of my securing device, being merely an endless elastic band, to accommodate which and keep it from slipping out of place the holder C is preferably notched or cut down at its center, as shown at $c$, a further purpose of this cutting down being to accommodate and hold firmly articles of different sizes. In place of this band D, I may use any equivalent form of securing device, such as a metal spiral spring; but I prefer the elastic band, as being simpler, neater, and cheaper. By reason of its elasticity it will hold one pencil in place, when all the others have been removed, just as firmly as if every compartment of the holder were full, and will also hold pencils, &c., of varying or different diameters; and the pencil, pens, &c., can be noiselessly withdrawn from the holder and case or replaced within it, which is a feature of importance, especially in schools, where stillness is desirable.

By making my box and holder of suitable size it may also be of great service to artists, by being used to contain colored crayons, stumps, brushes, &c., and, from its compactness and convenience, of great utility in sketching, as a large number of these articles can thus be readily transported, and always at hand in proper order for out-door work. In fact, the number of uses to which it may be put is very extensive; but it is especially adapted for the use illustrated in the drawings, and therein finds its greatest field of usefulness.

I am aware that a somewhat similar revolving device has heretofore been constructed for holding pencils and other articles, and the whole rolled up in a flexible wrapper; but I am not aware that any such device has been mounted in a rigid case, or in the manner shown by me, and this is most important, as otherwise the points of the pens and pencils would not be sufficiently protected, nor would any such device as that above described be adapted for convenient and instantaneous use.

Having thus described my invention, what I claim as new, and desire to secure by Letters Patent, is—

In a device for holding pencils, pen-holders, &c., the combination of the rigid case A, horizontally-revolving holder C, notched, as shown at c, and mounted on shaft B, and securing device D, adapted to hold the pencils, &c., firmly in place, and thereby protect their points from injury while revolving within the case, as set forth.

In testimony that I claim the foregoing I have hereunto set my hand on this 25th day of May, 1882, in the presence of two witnesses.

FRANK F. DUMKE.

Witnesses:
  HAROLD G. UNDERWOOD,
  CARL PICKHARDT.